United States Patent
Wedemeyer et al.

(10) Patent No.: US 12,397,509 B2
(45) Date of Patent: Aug. 26, 2025

(54) METHOD FOR PRODUCING A 3D STRUCTURE

(71) Applicant: LAEMPE MOESSNER SINTO GMBH, Barleben (DE)

(72) Inventors: Frank Wedemeyer, Zell im Wiesental (DE); Rudolf Wintgens, Schopfheim (DE)

(73) Assignee: LAEMPE MOESSNER SINTO GMBH, Barleben (DE)

(*) Notice: Subject to any disclaimer, the term of this patent is extended or adjusted under 35 U.S.C. 154(b) by 401 days.

(21) Appl. No.: 17/998,663

(22) PCT Filed: Jun. 9, 2021

(86) PCT No.: PCT/DE2021/000108
§ 371 (c)(1),
(2) Date: Nov. 13, 2022

(87) PCT Pub. No.: WO2021/249588
PCT Pub. Date: Dec. 16, 2021

(65) Prior Publication Data
US 2023/0191705 A1    Jun. 22, 2023

(30) Foreign Application Priority Data

Jun. 13, 2020 (DE) ............ 10 2020 003 536.1

(51) Int. Cl.
*B29C 64/393* (2017.01)
*B29C 64/10* (2017.01)
(Continued)

(52) U.S. Cl.
CPC ............ *B29C 64/393* (2017.08); *B29C 64/10* (2017.08); *B29C 64/214* (2017.08); *B33Y 10/00* (2014.12); *B33Y 40/20* (2020.01); *B33Y 50/02* (2014.12)

(58) Field of Classification Search
CPC ..... B29C 64/393; B29C 64/10; B29C 64/214; B29C 64/165; B33Y 10/00; B33Y 40/20;
(Continued)

(56) References Cited

U.S. PATENT DOCUMENTS 5,204,055 A   4/1993  Sachs et al.
5,387,380 A   2/1995  Cima et al.
(Continued)

FOREIGN PATENT DOCUMENTS

CN   110340354 A   10/2019
DE   69330495      12/1993
(Continued)

OTHER PUBLICATIONS

Co-Pending, co-owned, U.S. Appl. No. 17/754,936, filed Apr. 15, 2022.
(Continued)

*Primary Examiner* — Michael J Brown
(74) *Attorney, Agent, or Firm* — CARTER, DELUCA & FARRELL LLP; Peter DeLuca

(57) ABSTRACT

A method for producing a 3D structure based on the object of specifying a solution by which the layers are built up more reliable and more precisely in a 3D printing method. Specifically, by analyzing the data of the 3D structure to be produced, by identifying critical areas within the 3D structure to be generated, and by reducing the travel speed of working equipment of the 3D printer over the construction field at least temporarily if a critical area is identified while producing the 3D Structure.

18 Claims, 1 Drawing Sheet

(51) Int. Cl.
*B29C 64/214* (2017.01)
*B33Y 10/00* (2015.01)
*B22F 10/14* (2021.01)
*B22F 10/37* (2021.01)
*B33Y 40/20* (2020.01)
*B33Y 50/02* (2015.01)

(58) Field of Classification Search
CPC ......... B33Y 50/02; B33Y 30/00; Y02P 10/25; B22F 2999/00; B22F 10/14; B22F 10/28; B22F 10/37; B22F 12/90; B22F 10/85
USPC .......................................................... 700/98
See application file for complete search history.

(56) References Cited

U.S. PATENT DOCUMENTS

| | | | |
|---|---|---|---|
| 6,408,673 B1 | 6/2002 | Koerner et al. | |
| 7,879,393 B2 | 2/2011 | Edener et al. | |
| 10,183,442 B1 | 1/2019 | Miller | |
| 11,446,868 B2 | 9/2022 | Wedemeyer et al. | |
| 2004/0011456 A1 | 1/2004 | Futamura et al. | |
| 2004/0170765 A1 | 9/2004 | Ederer et al. | |
| 2004/0173946 A1 | 9/2004 | Pfeifer et al. | |
| 2006/0105102 A1 | 5/2006 | Hochsmann et al. | |
| 2009/0068376 A1 | 3/2009 | Philippi et al. | |
| 2010/0192787 A1 | 8/2010 | Onishi et al. | |
| 2011/0133367 A1 | 6/2011 | Weidinger et al. | |
| 2014/0227123 A1 | 8/2014 | Guenster et al. | |
| 2016/0107233 A1 | 4/2016 | Kobayashi et al. | |
| 2016/0193790 A1 | 7/2016 | Shuck et al. | |
| 2016/0368054 A1 | 12/2016 | Ng et al. | |
| 2017/0291373 A1 | 10/2017 | Hara | |
| 2017/0297263 A1 | 10/2017 | Ederer et al. | |
| 2017/0326792 A1 | 11/2017 | Paternoster et al. | |
| 2018/0001559 A1 | 1/2018 | Paternoster et al. | |
| 2018/0193918 A1 | 7/2018 | Griffith et al. | |
| 2018/0333913 A1 | 11/2018 | Lin et al. | |
| 2020/0038953 A1* | 2/2020 | Pavan | B22F 10/10 |
| 2021/0094237 A1* | 4/2021 | Weber | B29C 64/112 |

FOREIGN PATENT DOCUMENTS

| | | |
|---|---|---|
| DE | 10117875 | 1/2003 |
| DE | 102016013 | 10/2003 |
| DE | 10310385 | 9/2004 |
| DE | 10 2005 022 308 A1 | 11/2006 |
| DE | 102006023484 | 11/2007 |
| DE | 10 2009 0235258 A1 | 2/2011 |
| DE | 112013006029 | 9/2015 |
| DE | 10 2014 010929 | 1/2016 |
| DE | 10 2015 117749 A1 | 4/2016 |
| DE | 102014222129 | 4/2016 |
| DE | 10 2016 211952 | 1/2018 |
| DE | 10 2017 107362 A1 | 10/2018 |
| EP | 0431924 | 6/1991 |
| EP | 1494841 | 1/2005 |
| JP | 2018526527 | 9/2018 |
| WO | 2002/083323 | 10/2002 |
| WO | 03086726 | 10/2003 |
| WO | 2016/030375 | 3/2016 |
| WO | 2016095888 A1 | 6/2016 |
| WO | 2016098067 A1 | 6/2016 |
| WO | 2018/195191 | 10/2018 |

OTHER PUBLICATIONS

ISR dated Sep. 24, 2021 for counterpart PCT Application No. PCT/DE2021/000108 (4 pp.).

* cited by examiner

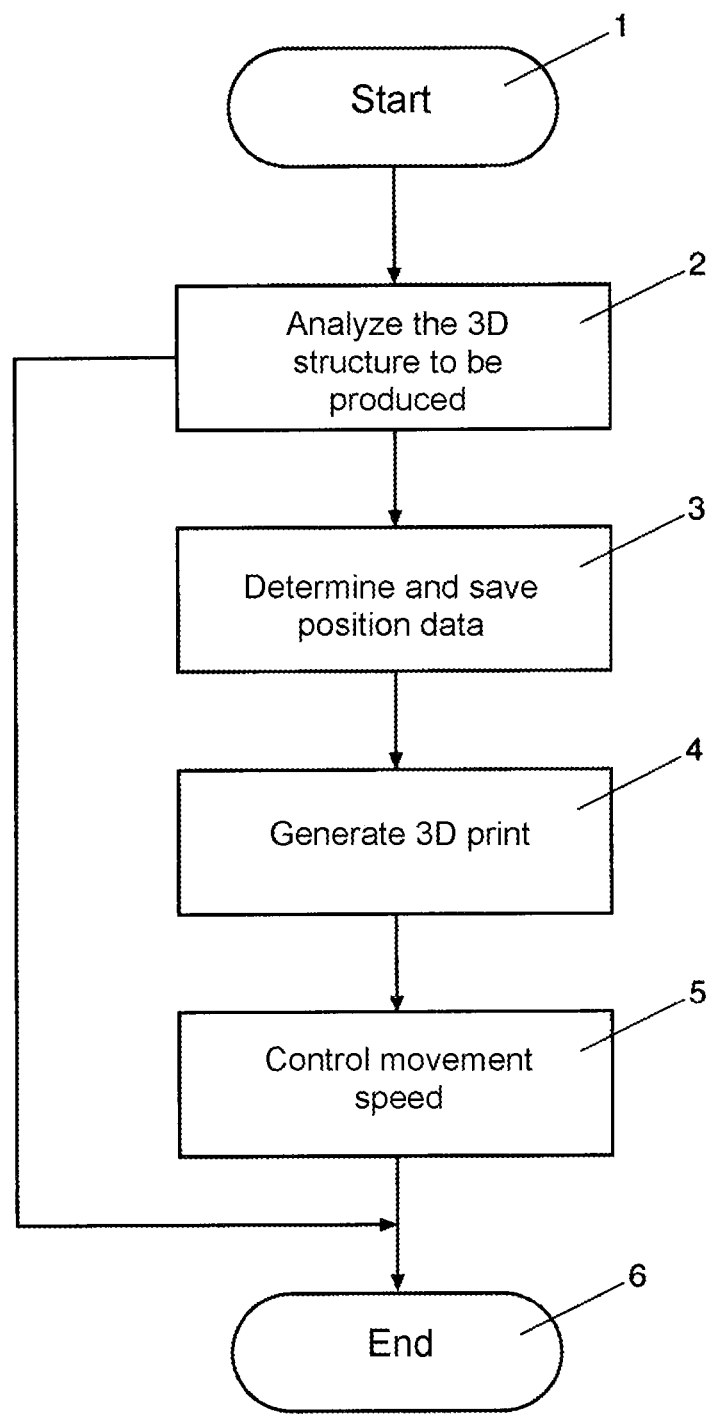

METHOD FOR PRODUCING A 3D STRUCTURE

CROSS-REFERENCE TO RELATED APPLICATIONS

This application is a national stage application, filed under 35 USC § 371, of International Patent Application No. PCT/DE2021/000108, filed on Jun. 9, 2021, claiming priority to DE 10 2020 003 536.1 filed on Jun. 13, 2020, each of which is herein incorporated by reference in its entirety.

BACKGROUND OF THE INVENTION

(1) Field of the Invention

The invention relates to a method for producing a 3D structure by building a 3D structure up layer-by-layer in a 3D printer.

It is known to use so-called 3D printing or a so-called 3D printing process to produce individual or series-produced components, workpieces or molds. In such printing processes, three-dimensional components or workpieces are produced layer-by-layer.

(2) Description of Related Art

The structure is produced under computer control from one or more liquid or solid materials according to specified dimensions and shapes. Specifications for the components or workpieces to be printed can be provided, for example, by so-called computer-aided design systems (CAD).

When printing the 3D structures or 3D components, physical or chemical hardening processes or a melting process take place in a particulate building material, which is also referred to as molding material. Building materials or molding materials such as plastics, synthetic resins, ceramics and metals are used as materials for such 3D printing processes.

Various manufacturing process sequences are known for the implementation of 3D printing processes.

However, several of these process sequences include the process steps shown below by way of example:

- Partial or full-surface application of particulate building material, also referred to as particulate material or powdered building material, on a so-called building field in order to form a layer of non-solidified particulate material;
- Selective solidification of the applied layer of non-solidified particulate building material in predetermined partial areas, for example by selective compacting, printing or application of treatment agent, such as a binder or by using a laser;
- Repetition of the previous process steps in a further layer level for the layer-by-layer construction of the component or workpiece. For this purpose, the component or workpiece, which is built up or printed on the construction field layer-by-layer, is lowered with the construction field by one layer level or one layer thickness, or the 3D printing device is raised by one layer level or one layer thickness with respect to the construction field before a new one layer is applied over part of the surface or the entire surface;
- Subsequent removal of loose, unconsolidated particulate building material surrounding the manufactured component or workpiece.

Various methods for generating a 3D structure or for applying particulate construction material to a construction field to generate a 3D structure are known from the prior art.

DE 10 2005 022 308 A1 discloses a coater and a method for applying powdered layers in a device for producing a three-dimensional object by solidifying layers of a powdered material at the locations corresponding to the respective cross section of the object.

The problem to be solved is to provide a device and a method for producing a three-dimensional object by solidifying layers of a powdered building material, which allow the building time for the three-dimensional object to be shortened.

For this purpose, the device has a coater, which can be moved over a construction field, for applying the layers of powdered construction material in the construction field. The coater is designed with a stiff blade that is rigidly connected to the coater. To preheat the powdered building material, the coater is provided with a heating device that is at least partially integrated into the coater. This makes it possible to preheat the powder while or before it is applied as a layer, thus reducing the overall construction time for the three-dimensional object.

WO 2016/095888 A1 discloses a method for producing three-dimensional molded parts using layer construction technology, wherein the moisture content of the building material mixture can be regulated.

A method and a material system are to be provided that ensure consistent material properties, in particular the flow properties of the building material, during the construction process.

It is therefore provided that the particulate building material is applied to a construction field in a defined layer thickness by means of a coater. Furthermore, a liquid binder is selectively applied to the building material via a print head, the liquid binder being polymerized by means of at least one activator introduced into the sand. The construction field can also be lowered by the layer thickness or the coater can be raised by one layer thickness, and these steps are repeated until the desired molded part is produced, wherein agents can be or are introduced into the construction material, the liquid binder and/or the activator, with which the moisture content of the building material mixture can be controlled.

In this process, the moisture in the sand is controlled. In particular, the water content and the liquid content are regulated or at least stabilized. In this way, essentially the same chemical and physical properties should always be achieved during the production of the three-dimensional molded parts.

In such conventional 3D printers, it is common for a layer or a plurality of layers to be built up at a constant or respectively identical speed. Speed refers here to the speed with which the working equipment of a 3D printer moves over the so-called construction field on which the 3D structure is produced.

To increase the efficiency of such 3D printers, this speed is also increased in order to be able to carry out a 3D printing process in less time. In this case, speeds or travel speeds of the working equipment over the construction site of 500 mm/s and more are achieved.

However, especially increasing speeds can cause problems with the exact construction of structures having small dimensions.

Disadvantageously this conventional process can cause, for example, partial areas in a layer currently being built up or in a layer below to tear or shift due to increasingly higher speeds when printing a layer in a 3D printer, in particular in areas that are fragile or mechanically vulnerable. This produces errors in the three-dimensional end product, which reduce quality and, in the worst case, lead to rejection of a product.

Thus, there is a need for an improvement in the prior art and thus for an improved method for creating a 3D structure in a 3D printer.

BRIEF SUMMARY OF THE INVENTION

It is an object of the invention to specify a method for producing a 3D structure or layers of a 3D structure in a 3D printer, with which the layers are reliably and precisely built up in a 3D printing process.

In particular, the quality of the 3D print should be ensured in critical areas where partial structures of the 3D structure can be torn open or shifted in a layer that is currently being built up or in a layer located below this layer.

The object is achieved by a method with the features according to claim 1 of the independent claims. Further developments are specified in the dependent claims.

It is intended to apply the method for generating a 3D structure in a 3D printer in all 3D printers or 3D printing machines where a substrate is applied and/or a fluid is applied, in particular in 3D printers or 3D printing machines in which the construction of the 3D structure is computer-controlled.

Such 3D printers have a control unit that controls the structure of the layers during 3D printing and receives control commands in a machine-readable form or a machine-readable code.

Such a machine-readable code with control commands that controls the generation of the layers in 3D printing can be generated from specifications for the components or workpieces to be printed by a computer-aided design system (CAD) and transmitted to the control unit of the 3D printer. This machine-readable code is usually a digital code which corresponds to the customary standards or norms, such as the international standard ICE 61131 or the international standard ICE 61499.

The 3D structure to be generated can be analyzed by locating so-called critical areas within the 3D structure to be generated or within the layers of the 3D structure to be generated.

In this analysis, in particular areas where there is a risk that errors will occur in the 3D structure to be generated when the current layer is applied are classified as critical areas. In this context, errors in the 3D structure to be generated are understood to represent, in particular, tearing and/or shifting of areas or of partial areas of the 3D structure to be generated in one or more layers.

Classified as critical areas are areas in which a partial structure of the 3D structure to be produced is applied directly to the surface of a substrate, since in this case insufficient adhesion can occur between the applied partial structure and the substrate. In this case, the substrate is a surface on which the 3D structure to be produced is built up layer-by-layer and which is also referred to as the construction field or construction bed of a 3D printer.

Such critical areas are also areas in which a partial structure of the 3D structure to be produced is to be applied to small partial structures of an underlying layer. Such small partial structures arise, for example, when the dimensions of the partial structures arranged in layers one above the other are so small so that only low mechanical strengths can be expected in a stack-like construction of these partial structures, for example. Partial structures with the smallest possible dimensions, for example in the range of a length of 0.1 mm and a width of 0.1 mm up to dimensions in the range of a length of 5 mm or more and a width of 5 mm or more, have such low strengths. These dimensions depend on the molding material, the processing speed of the molding material and the flow properties. In addition, such critical areas may also include part of a current layer or may be a complete layer, for example due to the costly or complicated 3D structure to be produced.

Of course, the length does not have to be the same as the width of the partial structure. In particular, long but very narrow partial structures in the range of the specified dimensions also have low mechanical strength during construction. The orientation of such narrow and long structures is also important here. If a long and narrow partial structure, for example with the dimensions of a length of 20 mm and a width of 0.3 mm, points with its longitudinal extent in the direction in which the working equipment of the 3D printer is moved over the construction field, problems arise in the layer structure, for example, only at the beginning and the end of this partial structure if the travel speed of the 3D printer's working equipment over the construction field is too high.

Such working equipment of the 3D printer is, for example, a scraping element such as a squeegee, a blade or an oscillating blade.

If the elongated partial structure is to be built up layer-by-layer with its longitudinal extent at an angle of 90 degrees to the direction in which the working equipment of the 3D printer is moved across the construction field, problems arise in the layer structure along the entire area of this elongated partial structure when the travel speed of the working equipment of the 3D printer over the construction field is too high.

Another critical area is an area in which a partial structure of the 3D structure to be produced is applied to a substrate that does not provide sufficient support in the event that the travel speed of the 3D printer's working equipment over the construction site is too high.

One such substrate is the particulate building material. This occurs when, after one of the several layers of the 3D structure to be produced has been built up, a partial structure is created at a point above the particulate building material by selective solidification or adhesion of the particulate building material at the point of this partial structure, since this partial structure has not yet been connected or does not have a connection point to the 3D structure to be produced. In this case, such a connection to the 3D structure is only established in the course of the 3D printing process in a layer that is to be produced later, which has a greater distance to the construction bed.

In addition, further criteria can be defined for critical areas and included in the analysis.

If a critical area in the structural design is identified during the analysis of the 3D structure to be produced, data or travel data for this identified critical area are generated and stored or documented. These data include at least information on the location or on a position of the identified critical area. Its position on or above the construction bed is therefore known with corresponding coordinates, for example in an X, a Y and a Z direction of a coordinate system on the construction field.

In addition to the X and Y coordinates of a critical area or of a partial structure to be produced in the current layer, these data can also include information about an outer contour or trace curve of the partial structure and/or its dimensions or extent, for example with a length and a width, also as a called bounding box.

It is to contemplated to transmit the data or travel data from the analysis, i.e. the identified critical areas, to the control unit. Such a transmission of the data to the control unit on the identified critical areas can take place independently or together with the transmission the data by the control unit that control the layered construction of the 3D structure.

It is contemplated that the control unit compares the current position of the 3D structure with the position data of the critical areas and, if a match is detected, change the speed of movement of the 3D printer's working equipment over the construction field.

This change can correspond to a significant reduction in travel speed in critical areas or in particularly critical areas. Alternatively, this change can be a less severe reduction in the travel speed in less critical areas.

In addition to changing the travel speed, it is contemplated to control the substrate discharge, i.e., the substrate quantity of the particulate substrate, which is applied per driving meter over the construction field, or to adapt the substrate discharge to the changing travel speed. In this way, the height of the applied particulate substrate is regulated or kept constant.

It is also contemplated to implement such comparison with a lead time and to reduce the travel speed of the working equipment of the 3D printer over the construction field shortly before a critical area is reached. A time can be set for this lead time. Alternatively, a distance can be set where the travel speed is reduced before reaching a critical area.

If the speed of movement of the working equipment of the 3D printer over the construction field is below a specified speed limit, no reduction in the travel speed is contemplated.

It is also contemplated that the control unit recognizes when such a critical area is left by comparing the current position of the structure of the 3D structure with the position data of the critical areas. In this case, the travel speed of the working equipment of the 3D printer over the construction field can be changed again, for example increased. Such an increase in the travel speed can continue until reaching again the travel speed at which the working equipment of the 3D printer has traveled before the critical region was reached. Alternatively, the increase in the travel speed can continue until a maximum possible travel speed of the working equipment has been reached.

It is also contemplated that during the analysis of the critical areas, a measure for the probability of the occurrence of defects in the three-dimensional end product is determined through this critical area. When this probability is high, the travel speed of the 3D printer's working equipment over the construction field is reduced more drastically than when this probability is low. In this way, particularly sensitive partial areas of the 3D structure can be reliably generated, wherein a smaller reduction in the travel speed of the working equipment provides a time advantage in generating the 3D structure in less sensitive partial areas.

It is also contemplated to adjust so-called substrate application parameters commensurate with changes in the travel speed of the working equipment. In this case, for example, a quantity of a particulate substrate to be applied to a layer is influenced as a function of the speed. Thus, the quantity of the particulate substrate to be applied per unit of time increases with increasing speed in order to achieve a constant layer thickness of the particulate substrate and vice versa.

BRIEF DESCRIPTION OF THE DRAWINGS

The aforedescribed features and advantages of this invention will be better understood and appreciated after a careful study of the following detailed description of preferred non-limiting exemplary embodiments of the invention, in conjunction with the accompanying drawing, which shows in:

FIG. 1: an exemplary process sequence of the method according to the invention for generating a 3D structure in a 3D printer.

DETAILED DESCRIPTION OF THE INVENTION

FIG. 1 shows an exemplary process sequence of the method according to the invention for generating a 3D structure in a 3D printer.

In step 1, the method for generating a 3D structure or layers of a 3D structure in a 3D printer starts.

In a second step 2, the 3D structure to be produced is analyzed by identifying so-called critical areas within the 3D structure to be produced or within the layers of the 3D structure to be produced. The data for generating the 3D structure on which the analysis is based can be generated, for example, with a computer-aided construction system and are present in a machine-readable form such as a digital code.

In this analysis, critical areas, i.e., mechanically susceptible areas in which partial structures according to the examples listed above can be torn open or shifted, are identified. In step 3, position data for these areas are determined and stored. These position data can correspond, for example, to an X-, a Y- and a Z-direction of a coordinate system on the construction field. Alternatively, just one X- and one Y-coordinate over the construction field and a number for the corresponding layer in which the identified critical area is located may also be determined.

If no critical areas are determined in step 2 during the analysis of the 3D structure to be produced, the method for producing a 3D structure is terminated in step 6. 3D printing takes place in parallel under control by a control unit, which converts the machine-readable data generated by the computer-aided design system and controls the 3D printing.

The position data determined in step 3 are transmitted to the control unit that controls the 3D print, such as a programmable logic controller (PLC), and are incorporated accordingly into the control sequence of the 3D print.

If while producing a 3D print, a position is reached in step 4, which was identified as a critical area in the previous analysis, the control unit changes or reduces the travel speed of the working equipment of the 3D printer over the construction field in step 5.

This reduction in the travel speed of the working equipment can already take place shortly before a critical area is reached in step 5. After leaving a critical area, the travel speed of the working equipment is increased again in step 5, wherein this increase in speed can also take place with a time delay.

The increase in the travel speed of the working equipment takes place, for example, until the travel speed before reaching the critical range or a maximum possible speed is reached.

In parallel with controlling the travel speed of the 3D printer's working equipment over the construction field, the control unit also adjusts as a function of the travel speed parameters that are associated with a change in the travel speed, such as the amount of particulate material to be applied to a layer per unit of time or a pressure force of a blade with which the particulate material can be pulled and/or solidified.

Alternatively, the travel speed of the working equipment may be reduced by the control unit for an area that spatially extends far beyond a critical area.

The travel speed of the working equipment may also be reduced for the entire current layer if one or more critical areas are found in the analysis in this layer.

The travel speed of the working equipment may also be reduced for the entire current layer when a certain number of critical areas has been analyzed, in order to ensure, for example, a more continuous movement of the working equipment of the 3D printer over the construction field.

With the completion of the 3D print, the process for creating a 3D structure is terminated in step 6.

In one example, such a travel speed of the working equipment of the 3D printer over the construction field can be 1000 mm/s, while the travel speed of the working equipment in or in front of critical areas is reduced to 300 mm/s.

LIST OF REFERENCES

1 Start
2 Analyze the 3D structure to be produced
3 Determine and save position data
4 Generate 3D print
5 Control travel speed
6 End

The invention claimed is:

1. A method for generating a 3D structure, wherein the 3D structure is built up on a construction field layer-by-layer in a 3D printer using predetermined data of the 3D structure to be produced, the method comprising the steps of:
   analyzing the predetermined data of the 3D structure to be produced, with critical areas within the 3D structure to be produced being identified in the analysis; and
   in the event that an identified critical area is reached while the 3D structure is being produced and a travel speed of working equipment of the 3D printer exceeds a speed limit, at least temporarily reducing the travel speed of the working equipment of the 3D printer over the construction field, wherein the travel speed of the working equipment is reduced before the identified critical area is reached based on at least one of a predetermined time period or a predetermined distance.

2. The method according to claim 1, wherein the identified critical area is an area where a partial structure of the 3D structure to be produced is applied:
   (i) directly to a surface of a substrate or of a construction field;
   (ii) to small partial structures of a layer below; and/or
   (iii) to a substrate which does not provide adequate support.

3. The method according to claim 1, further comprising the step of generating and storing position data for the identified critical area.

4. The method according to claim 3, wherein:
   the position data contain information on a number of a layer and an X-coordinate and a Y-coordinate in a coordinate system on the construction field, or the position data contain an X-coordinate, a Y-coordinate and a Z-coordinate in a coordinate system on the construction field.

5. The method according to claim 3, wherein the generated position data are transmitted to a control unit which controls the 3D printing by using the predetermined data of the 3D structure to be produced and which controls the travel speed of the working equipment by using the position data.

6. The method according to claim 5, wherein the control unit adjusts parameters for controlling the quantity of a particulate substrate to be applied per unit of time in parallel with controlling the travel speed of the working equipment, so as to ensure a uniform layer thickness of the particulate substrate.

7. The method according to claim 5, wherein, in parallel with controlling the travel speed of the working equipment, the control unit adjusts parameters for controlling a pressure force of a blade applied to a particulate substrate.

8. The method according to claim 3, wherein the predetermined data of the 3D structure to be produced and the position data are provided in a machine-readable form.

9. The method according to claim 1, wherein after the identified critical area has been left, increasing the travel speed of the working equipment to:
   (i) before the identified critical area was reached, or
   (ii) a maximum possible travel speed of the working equipment.

10. The method according to claim 1, wherein the identified critical area has a dimension with a length of less than 5 mm and/or a width of less than 5 mm.

11. The method according to claim 10, wherein the identified critical area has a dimension with a length of less than 1 mm and/or a width of less than 1 mm.

12. The method according to claim 1, wherein the working equipment is a scraping element.

13. The method according to claim 12, wherein the scraping element is a squeegee, a blade or an oscillating blade.

14. The method according to claim 1, further comprising:
   in the event that the identified critical area is left while the 3D structure is being produced, at least temporarily increasing the travel speed of the working equipment of the 3D printer over the construction field.

15. The method according to claim 14, wherein the travel speed of the working equipment is increased to a maximum travel speed of the working equipment after leaving the identified critical area.

16. The method according to claim 14, wherein the travel speed of the working equipment is increased after a time delay.

17. The method according to claim 1, wherein, when analyzing the predetermined data of the 3D structure to be produced, a probability for an occurrence of defects is determined for each identified critical area.

18. The method according to claim 17, further comprising:
   if the probability for an occurrence of defects for the identified area is greater than a threshold probability, further reducing the travel speed of the working equipment.

* * * * *